Oct. 31, 1961  R. B. TILNEY  3,006,323
HYDRAULIC SERVO POWER VALVE WITH MANUALLY
OPERABLE SAFETY PROVISIONS
Filed July 25, 1957  3 Sheets-Sheet 1
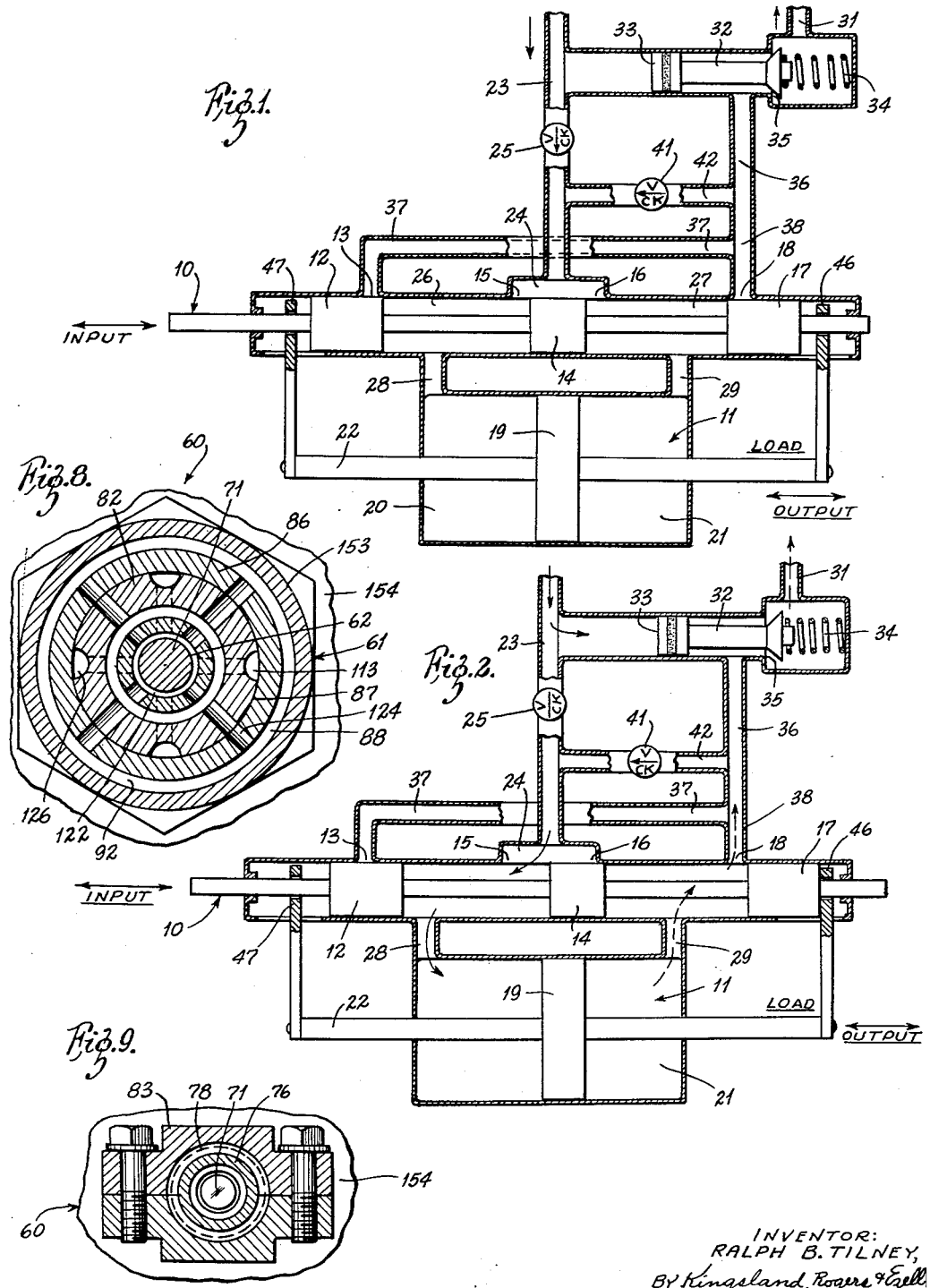
INVENTOR:
RALPH B. TILNEY,
By Kingsland, Rogers & Ezell
ATTORNEYS

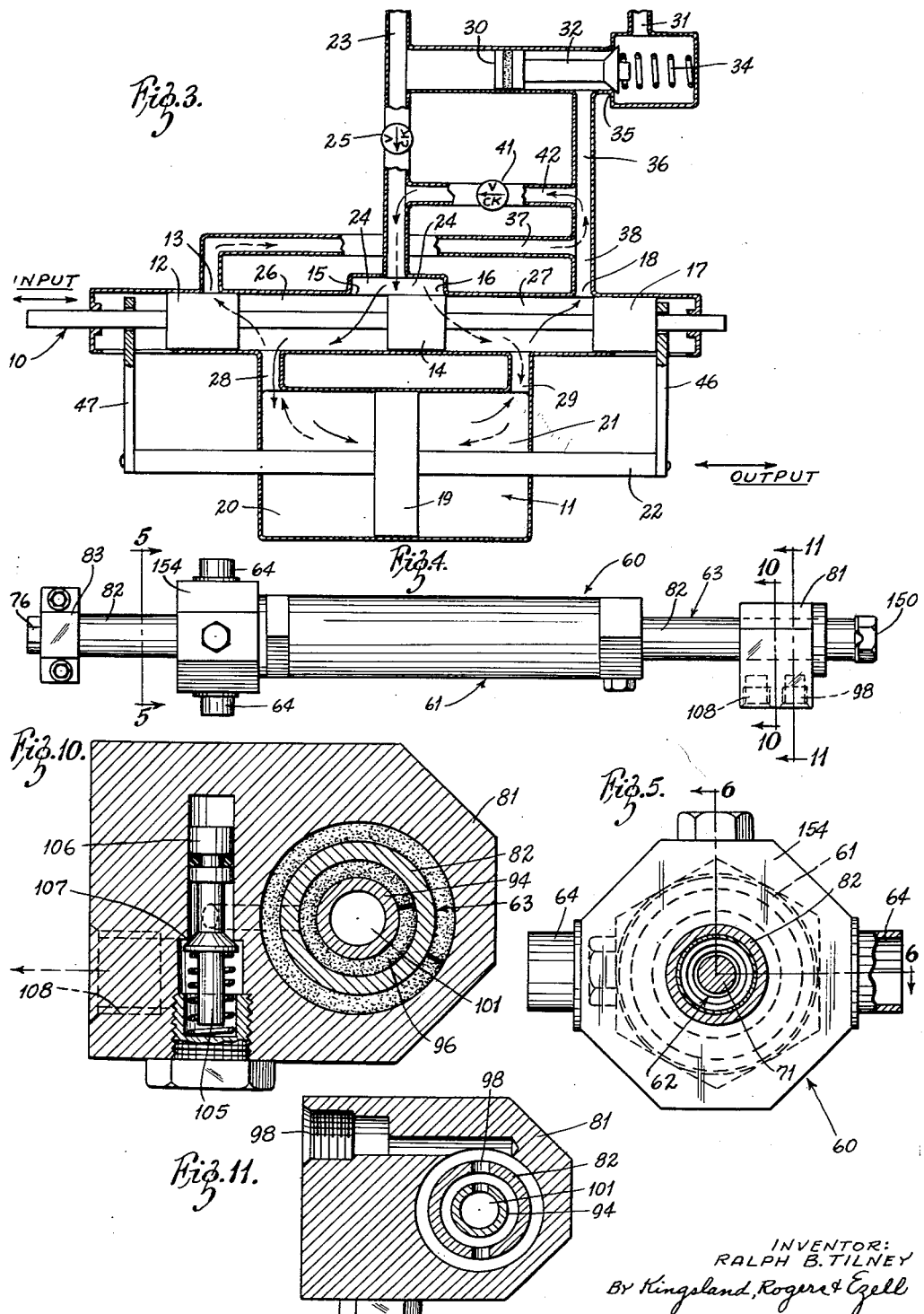

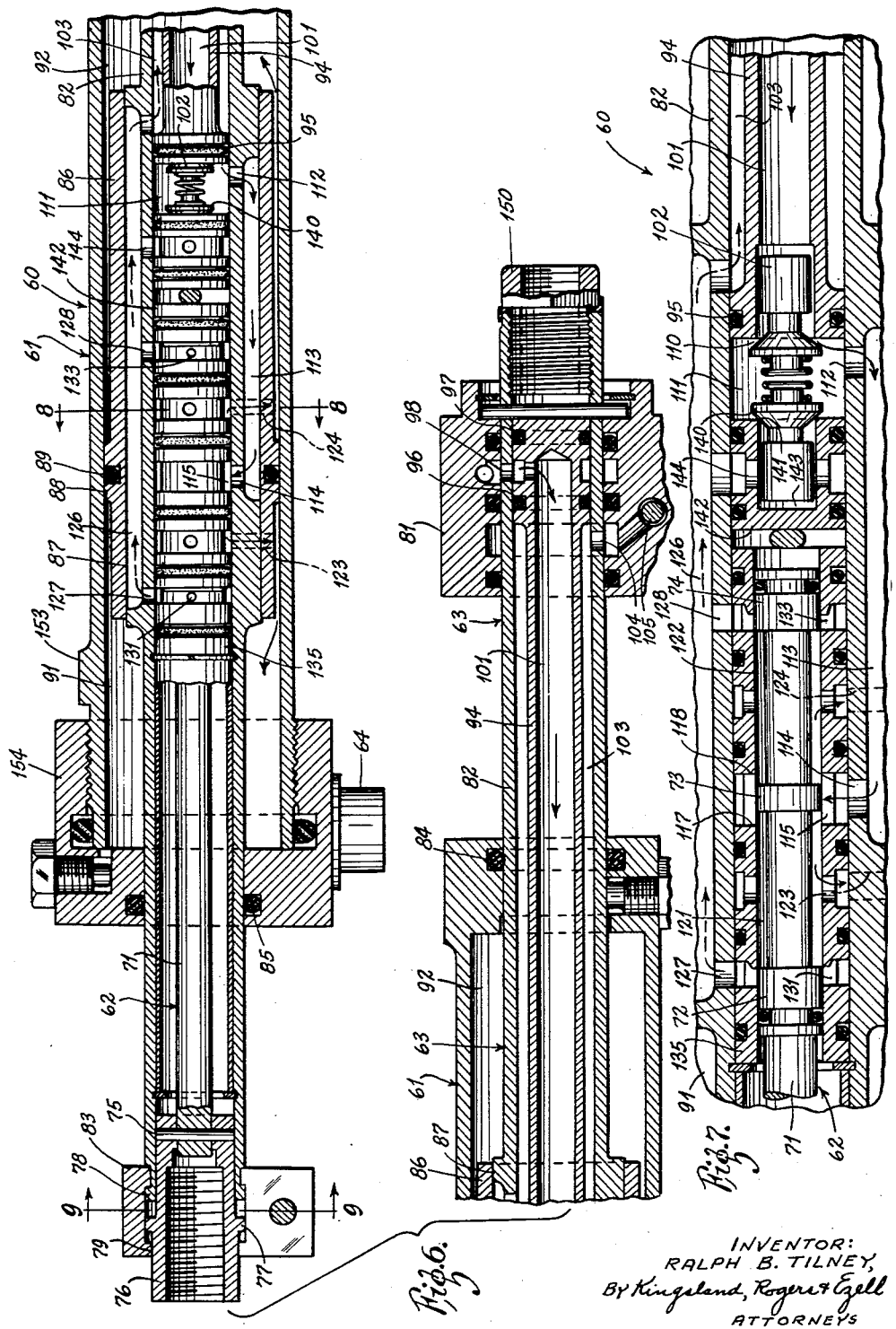

United States Patent Office 3,006,323
Patented Oct. 31, 1961

3,006,323
HYDRAULIC SERVO POWER VALVE WITH MANUALLY OPERABLE SAFETY PROVISIONS
Ralph B. Tilney, Clayton, Mo., assignor to Alco Valve Company, St. Louis, Mo., a corporation of Missouri
Filed July 25, 1957, Ser. No. 674,234
3 Claims. (Cl. 121—41)

This invention relates to improvements in hydraulically operated servo mechanism power valves and in particular is concerned with such a valve which is manually operable when the hydraulic system fails.

In this invention a hydraulically operated control valve has been provided wherein an input rod which may be manually operated is adapted to control automatically a power piston rod through a servo mechanism principle. In this device the movement of the input rod is effected without the requirement of any power since it serves only as a floating control and as a servo mechanism operating rod to control the operation of the hydraulically operated piston. The hydraulically operated piston is adapted to be powered by hydraulic pressures of varying degree anywhere from several p.s.i. up to several thousand p.s.i. as will be readily understood in the art.

In such devices in the past, there has been a particular problem which exists when the hydraulic pressure fails. By means of the instant invention there has been provided a manually operated mechanism in which the input rod may be moved to mechanically move the piston rod. This is accomplished by trapping hydraulic fluid within the piston and effecting the displacement through the special valving arrangement provided in this invention.

In this invention the movement of the input rod is designed to effect a corresponding movement of the piston without the reflection of any resisting force upon the input rod. An extremely rugged, efficiently operating, and conveniently constructed mechanism has been provided by this invention which has a particular advantage in the manually operable safety means when the hydraulic pressure fails which permits the operation by the operator. The servo valve is adaptable for employment with a wide field of mechanisms which are to be operated by a power member and this adaptability is of special advantage due to the relatively simple application of this invention.

Accordingly it is a primary object of this invention to provide a hydraulically operated servo mechanism power valve which has a manually operable means for operation of the device when hydraulic pressure fails.

It is another object of this invention to provide a hydraulically operated servo valve having a manually movable input rod which may be operated without any substantial work being performed upon it to control a valving arrangement for operating a work piston rod and in which the input rod may be manually operated to move the piston rod when the hydraulic pressure fails.

Still another object of this invention is to provide a hydraulically operated servo valve mechanism comprising a manually operated input rod and a work piston rod in which the hydraulic fluid is adapted to be trapped within the hydraulic piston rod and its associated valves when the hydraulic pressure fails to permit the manual operation of the input rod to effect the movement of the piston rod.

Still a further object of this invention is to provide a hydraulically operated servo valve mechanism comprising a manually movable input member and a working piston operated by high pressure hydraulic fluid which is controlled by the movement of the input member in a completely self-contained valve housing and in which the input rod is contained within the structure of the piston cylinder.

Still a further object of this invention is to provide a hydraulically operated servo valve mechanism comprising a manually movable input member and a working piston cylinder in a completely self-contained unit of standard materials of construction which is rugged and simple to operate.

Further objects of this invention will appear in the detailed description which follows and will be further apparent to those skilled in the art.

For the purpose of illustration there are shown in the accompanying drawings a preferred embodiment of this invention and several schematic illustrations of the movements of the principal parts required in the apparatus. It is to be understood that these drawings are for the purpose of illustration only and that the invention is not limited thereto.

In the drawings:

FIGURE 1 is a schematic diagram of the servo valve in the neutral position;

FIGURE 2 is a schematic diagram similar to FIGURE 1 showing the operation of the piston rod when the input member is moved forwardly, i.e., to the right, when the hydraulic system is properly functioning;

FIGURE 3 is a schematic diagram taken similarly to FIGURE 1 showing the provisions for manual movement when the hydraulic pressure is interrupted and showing the input member moved to the right to manually move the piston rod to the right;

FIGURE 4 is a plan view of an actual servo valve mechanism constructed according to this invention;

FIGURE 5 is an end view of the servo valve taken on line 5—5 of FIGURE 4;

FIGURE 6 is a view in section taken on the line 6—6 of FIGURE 5 showing the internal valve construction in the apparatus;

FIGURE 7 is an enlarged view in section taken similarly to FIGURE 6 showing the arrangement of the hydraulic pressure ports and check valve construction in the central portion of the apparatus;

FIGURE 8 is a view in section taken on the line 8—8 of FIGURE 6 showing the portion arrangement for the input valve and the valving arrangement to the piston cylinder;

FIGURE 9 is a view in section taken on line 9—9 of FIGURE 6 showing the relationship of the input member and the stop construction on the output member;

FIGURE 10 is a view in section taken on line 10—10 of FIGURE 4 showing the check valve structure for the hydraulic inlet and outlet; and FIGURE 11 is a view in section taken on line 11—11 of FIGURE 4 showing the porting arrangement for the high pressure side of the hydraulic inlet and outlet block.

*The schematic diagrams*

In view of the relatively complex nature of the construction and operation of the actual servo mechanism valve shown in FIGURES 4 to 8, reference will be first made to the schematic diagrams in FIGURES 1, 2 and 3. In the schematic diagrams, the basic operation of the servo mechanism is portrayed in a relatively simple manner.

The schematic diagrams of FIGURES 1, 2 and 3 show, respectively, the valve in a neutral position, a position for operation with hydraulic power, and a position for emergency operation by manual control when the hydraulic pressure fails. It is to be understood in these schematic drawings that the actual connections and the structures of the input rod and the output cylinder are for purposes of relation only and that the true physical connections and structure have been deleted for sake of simplicity.

In FIGURE 1 the input member is generally designated by the reference numeral 10. This member together with the output cylinder 11 forms the basic elements of the servo mechanism. The input member is in the form of a valve spool and is comprised of a front land 12 which cooperates with a valve port 13, a center land 14 which cooperates with valve ports 15 and 16 and a rear land 17 which cooperates with a valve port 18.

The output cylinder 11 is comprised of a piston 19, movable within piston chambers 20 and 21, and a piston rod 22. The piston rod may be connected to a work load in any convenient fashion. The porting and conduit arrangement includes a conduit 23 adapted to be connected to a source of hydraulic pressure which leads to an inlet chamber 24 adjacent to the center land of the input member. This conduit is provided with a unidirectional check valve 25 to prevent the back flow from the apparatus of any hydraulic fluid should the hydraulic pressure be interrupted. On either side of the inlet chamber 24 are valve chambers 26 and 27 which are designated front and rear chambers respectively. The front chamber 26 communicates with a passageway 28 leading to the piston chamber 20 while the rear chamber 27 communicates through a passageway 29 with the rear cylinder chamber 21. By means of the above designated high pressure line 23 and the inlet chamber 24 and the front and rear inlet valve chambers 26 and 27, high pressure hydraulic fluid is adapted to be introduced to either side of the piston or can be ported therefrom and returned to the system as will be further described.

The return conduits for returning hydraulic pressure to the hydraulic system comprise a return line 31 which is controlled by a pressure driven check valve 32 which has a piston face 33 in communication with the high pressure line. This valve is biased by a spring 34 to a closed position with the valve port 35 when the hydraulic pressure fails in the conduit 23. The valve will be normally opened during the operation of the hydraulic system. The return system is in communication with outlet conduit 31 through conduit 36 and branch conduits 37 and 38 which lead respectively to the front and rear valve ports 13 and 18 for the input members. A unidirectional check valve 41 is provided in conduit 42 connecting the high pressure inlet conduit 23 with the return conduit 36. This valve permits flow from the conduit 36 to the high pressure conduit 23 only when the hydraulic pressure system is interrupted under certain conditions as will be further described and prevents flow in the reverse direction.

In FIGURE 1 the input member is shown in the balanced position. In this condition high pressure fluid is introduced through the conduit 23 and flows into the inlet chamber 24 and from there through the passageway 28 and 29 onto either side of the output cylinder 12 in the chambers 20 and 21. When the input member is manually moved by an operator to the right as shown in FIGURE 2, the output piston rod 22 will be caused to be correspondingly moved. This movement is effected completely by hydraulic power and is without any manual effort by the operator upon the input rod. In FIGURE 2 the path of the high pressure fluid is shown in full lines and the path of the fluid exhausted through the return conduit 31 is shown in dotted lines.

For movement forwardly, i.e., to the right, it will be seen that the input member closes the valve port 13 through the action of the land 12 and opens the valve port 18 through the movement of the rear land 17. Thus high pressure fluid will flow through the inlet conduit 23 through the inlet chamber 24 down the passageway 28 and into the front cylinder chamber 20 and against the face of the cylinder 12. Relief for the fluid trapped within the chamber 21 is provided through the opening of the exhaust check valve 32. Thus the exhausted fluid will flow through the passageway 29 and the rear chamber 27 in the input valve member and through the valve port 18 and the relief conduits 38 and 36 out through the exhaust conduit 31 back to the hydraulic system.

The reversed operation for movement of the output piston rod rearwardly, i.e., to the left, is effected by reversing the movement of the input member. Thus the input member is withdrawn past the neutral position of FIGURE 1 to a position reversely corresponding to that of FIGURE 2 to open the valve port 13 and close the port 18. The path of the high pressure fluid in this condition will be through the inlet conduit 23 to the inlet chamber 24 and the rear chamber 27 of the input member and down through passageway 29 to the rear cylinder chamber 21. The exhausted fluid will flow from the cylinder chamber 20 to the passageway 28 through the front input member chamber 26 and the opened valve port 13 to the conduit 37 and thence to the conduits 36 and the check valve 32 through the return conduit 31 back to the hydraulic system.

The manual operation is schematically portrayed in FIGURE 3. When the hydraulic system fails the fluid pressure within the chambers 20 and 21 of the output cylinder will establish a high pressure within the system which is higher than the inlet pressure to the check valve 25 and this will cause the closure of the check valve to trap the fluids within the system. Likewise the check valve 32 will be closed due to the failure of the hydraulic system and the biasing action of the spring 34 will close the valve port 35. This effectively seals all of the hydraulic fluid within the valves and prevents any escape to permit the manual operation described below.

After the hydraulic system has failed and the fluid has been trapped as above-described within the valves, the input member may be moved to the right to manually move the output piston rod 22. This is effected by the movement shown in FIGURE 3 where it will be observed that the input member is freely moved without any corresponding movement of the output piston rod until the rear land 17 contacts a stop member 46 which may be integrally connected to the rear end of the output piston. Further movement of the input member to the right will cause the movement of the output piston to the right by manual force. In this condition high pressure will be created within the chamber 21 which will escape through passageway 29 and the input member rear chamber 27 to the opened valve port 18 as shown in the full lines in this drawing. From valve port 18 the fluid will travel to the conduit 38 and through the check valve 41 of the conduit 42 back through the inlet chamber 24 and thence to the front chamber 26 and the passageway 28 back to the front chamber 20 in the piston cylinder. In essence this is a floating action within the piston cylinder and no resistance of any substantial consequence is encountered. As a result the output piston rod may be manually operated by operation of the input member.

The reverse manual operation is effected in a reverse manner to that above-described by withdrawing the input member to the left as shown in FIGURE 3 until the stop member 47 is contacted. This member is connected to the front of the piston rod 22 and when further moved by the input member makes possible the manual operation of the piston rod. For this condition the flow of the fluid trapped within the high pressure chamber 20 of the cylinder is as shown in dotted lines. Thus it will be seen that the fluid flows through the passageway 28 through the front chamber 26 of the input member and through the opened valve port 13 and from there through the conduit 37 to the conduit 38 and through the unidirectional check valve 41. After passing through the check valve the fluid passes through the inlet conduit 23 and is there charged to the inlet chamber 24 of the input member and then passes through the rear chamber 27 and the passageway 29 back to the rear cylinder chamber 21.

As a further consequence of the manual provisions of this mechanism, whereby operation may be accomplished during the failure of hydraulic pressures, it will be noted that the output piston rod 22 can be locked in place by proper control of the input member. This locking in place is actually effected by a manual operation of the input member when the load created upon the piston rod is such as to cause movement of the piston rod when the input member is in the neutral position of FIGURE 1 during the failure of the system. Thus should the load on the piston rod 22 be such as to cause it to move generally to the left as viewed in FIGURE 1, the input member may be moved to counteract this movement and to stop it completely by moving the input member in an opposite direction, i.e., to the right. When moved to the right as shown in FIGURE 3, the operator may hold the input member in this position without actually applying any substantial force against the stop member 46 to trap the hydraulic fluid within the system and to prevent its flow. This may be done by merely moving the input member until the center land 14 closes the valve port 16 to block off flow into chamber 27 as shown in FIG. 3. In this condition any high pressure fluid created by movement of the piston rod to the left will be trapped since the fluid cannot move through the passageway 28 back through the passageway 29 into the chamber 21 since the valve ports 13 and 16 are both closed and the fluid cannot flow back through the unidirectional check valve 41. In like manner the operator may stop movement in the right hand direction of the piston rod 22 caused by the load by reversely moving the input member in the left hand direction. In such a condition the high pressure fluid created by the load within the chamber 21 will be locked or sealed from movement by the closing of the port 15 and the port 18 by the center land 14 and the rear land 17, respectively. The fluid will not be able to move reversely through the inlet conduit since the unidirectional check valve 41 prevents such flow as in the previously mentioned condition. Thus in any type of movement caused by the load, the operator may control and effectively lock the output piston in place and stop the movement of the load by the proper manipulation of the input member since the hydraulic fluid is effectively trapped within the system by such manipulation.

*The apparatus*

The physical structure of the servo mechanism power control valve is shown in FIGURES 4 through 11. In these figures the power control valve is generally designated by the reference numeral 60. Its main components include a housing 61, input member 62, output cylinder 63 and a trunnion mounting 64. In this construction it will be noted that the input member 62 operates in line with the output cylinder and, as further appears, is actually concentric with the cylinder chambers in the interior thereof.

The input member 62 is basically of the same construction as the input member 10 shown in the schematic diagrams of FIGURES 1, 2 and 3. Thus it is composed of a long rod 71 having a front land 72, a center land 73 and a rear land 74. At the front end it is connected by a pin 75 to a threaded socket 76. This threaded socket may be connected to a handle or the like (not shown) in order that the operator may manually move the input member. The socket is further provided with a manual contacting flange 77 which is adapted to bear against stops 78 and 79 provided on the output rod 63 for manual operation as will further appear.

The output member 63 is best shown in FIGURES 6 and 7. At the very rear it is mounted to a swivel block 81 which provides for connection to a hydraulic system as will further be described. The basic element of the output member 63 comprises a long tubular member 82. This member is rotatably mounted within the swivel block 81 at its rear end and has sealing rings to provide for proper sealing of the hydraulic fluid. The tubular element 82 is integral and extends all the way through the housing at the front end of the apparatus where it slidably receives the socket 76. A sleeve member 83 is fitted on this end of the tubular element 82 to provide the structure for the stops 78 and 79. The entire tubular structure is slidably received within the housing 61 and is sealed from the interior thereof by suitable O-rings 84 and 85 disposed at the opposite ends of the housing.

A cylinder sleeve 86 is press fitted to a raised portion 87 on the center of the tubular member 82 of the output rod to provide a part of the cylinder. The sleeve 86 is further provided with a piston wall 88 which receives an O-ring 89 to seal off a front cylinder chamber 91 from a rear cylinder chamber 92. The chambers 91 and 92 correspond respectively to the chambers 20 and 21 shown in the schematic diagrams of FIGURES 1 to 3.

A high pressure fluid inlet tube 94 is rotatably received within the interior of the inlet tube 82 as shown in FIGURE 6. The high pressure tube 94 is provided with a sealing O-ring 95 at its front end and sealing O-rings 96 and 97 at its rear end. The latter two O-rings are spaced on either side of a passageway 98 which is the high pressure inlet as shown in FIGURE 7 and may be connected to the pressure side of a hydraulic system. The interior of the high pressure tube 94 establishes a passageway 101 for the introduction of high pressure fluid to a unidirectional check valve 102 in much the same manner as the inlet tube 23 passes high pressure fluid through the check valve 25 in the schematic diagram of FIGURE 1. A passageway 103 is defined between the exterior of the inlet pressure tube 94 and output tube 82 to port exhaust fluid from the center of the apparatus back through a passageway 104 leading to the high pressure emergency check valve 105. This check valve corresponds to the check valve 32 of FIGURE 1 and has a piston head 106 which is closed in normal operation by the high pressure fluid acting on its face which is opened. The opening of the check valve 105 permits passage of exhaust fluid from the passageway 104 through the valve port 107 to the exhaust outlet 108.

The interior porting arrangements and valving provisions within the apparatus are best shown in FIGURES 6, 7 and 8. As shown in these drawings, the high pressure inlet fluid through the passage 101 is controlled by the check valve 102 through valve port 110. This controls the passage of fluid through a chamber 111 and an opening 112 within the tubular output rod 82 into a high pressure passage 113 defined between the output tube 82 and the cylinder sleeve 86. This chamber has an opening 114 provided in the tubular output member 82 which ports high pressure fluid into a center chamber 115 opposite the center land 73 of the input member. Front and rear valve ports 117 and 118, respectively, are defined on either side of this chamber. Input member front and rear chambers 121 and 122, respectively, are adapted to receive high pressure fluid through these valve ports depending upon the position of the input member.

High pressure fluid may be ported to the front cylinder chamber 91 through a passageway 123 communicating with the chamber 121 on one side and the chamber 91 on the other side. Similarly a passageway 124 connects the rear input chamber with the rear cylinder chamber 92.

The exhaust porting arrangement is provided by an exhaust passageway 126 which communicates at its rear end with the passageway 103. The forward end of the exhaust passageway 126 is adapted to communicate with the front and rear input chamber 121 and 122, respectively, by passageways 127 and 128. The passageway 127 communicates with the front input chamber through a valve port 131 controlled by the front land 72 of the input member while the passageway 127 communicates with the rear input chamber through a valve port 133 controlled by the rear land 74 of the input member.

It will be noted that an interior sleeve 135 provided with the above named passageways and chambers is provided fitting between the tubular member 82 and the valve spool with the front, center and rear lands of the input member. Sealing rings are provided to provide for proper sealing and the entire arrangement makes possible a very easy construction and removal for maintenance where desired.

The manual safety operating mechanism which provides for the manual operation of the input member when the hydraulic system fails is controlled by the unidirectional check valve 102, previously described, and the unidirectional check valve 140 which corresponds to the check valve 41 in the schematic diagrams of FIGURES 1, 2 and 3. This latter check valve is normally closed against a valve port 141 provided in the short tubular member 142 which is disposed on the interior of the output tubular member 82. The valve port 141 controls the flow of fluid through a chamber 143 which is connected at its other end through a passageway 144 communicating with the exhaust passageway 126.

The hydraulic lines may be connected to the high pressure inlet 98 and the exhaust outlet 108 by suitable hoses or the like connected to the swivel block 81. The swivel block 81 may rotatably move with respect to the tubular output member 82 so that a relatively complete freedom of movement is obtainable.

The structure above defined provides for a simple operated servo mechanism in which the movement of the input member 62 causes the responsive and controlled movement of the input member 63. The rear end of the output member 63 may be connected to any type of work load by means of the socket 150 which is secured to the end of the tubular output member 82.

It will be understood that when the input member is moved forwardly the output member moves responsively and to the same entent as the extent of movement of the input member. The same is true when the input member is retracted and the output member will likewise retract. This entire movement is with respect to the housing 61 which is stationary during the entire operation since it is mounted upon a trunnion 64.

A further advantage of this structure is that it may be very simply broken down for maintenance where desired. The housing 61 is comprised of the casing 153 which is threaded at its forward end to be internally received within the trunnion mounting block 154. By virtue of the concentric arrangement of the various tubular elements and the in line positioning of the input member with respect to the output member all the parts may be easily withdrawn where desired should this be necessitated for any reason.

*Operation of the apparatus*

The apparatus of FIGURES 4 to 11, which is the actual servo mechanism valve structure of this invention, will be further described with respect to the normal operation when the hydraulic system is properly operating. In this condition the relationship of the parts will be set forth when the device is in the balanced condition which is shown in FIGURE 6.

When the input member is at rest in the position shown in FIGURE 6, high pressure fluid is introduced through the high pressure port 98 and travels through the high pressure inlet passage 101 as shown in the heavy black arrows. From the high pressure inlet passage 101 the fluid passes through the opened check valve 102 through the passageway 112 and 113 and thence to passageway 114 into the center chamber 115 of the inlet member. From the central chamber 115 the high pressure fluid flows on either side of the center lands 73 through the opened ports 117 and 118 to the front and rear chambers 121 and 122. From these chambers the high pressure flows into both of the front and rear cylinder chambers 91 and 92, respectively, by passage through the passageways 123 and 124 connecting these chambers with the aforementioned front and rear chambers of the input member. The apparatus is balanced in this condition.

When it is desired to push the output member 63 to the rear the input member 62 is moved in that direction. When the input member is so moved the center land 74 will open the valve port 133 while the valve port 131 will remain closed by the front land 72. Likewise the center land 73 will close the port 118 and prevent high pressure fluid from passing through passageway 124 into the rear cylinder chamber 92. Thus high pressure fluid will pass only into the front chamber 91 and will establish an unbalanced condition. In effect high pressure fluid is pumped into the piston chamber 91 while the fluid in the chamber 92 will be exhausted since the fluid therein will flow through the passageway 124 to the rear input chamber 122 and then through the opened port 133 and the passageway 127 into the exhaust passageway 126. From the exhaust passageway 126 the flow will be as indicated in dotted lines through the exhaust passageway 103 and from there through the port 104 and past the opened check valve 105 through the exhaust port 108 in the swivel block. During this entire operation the check valve 140 will be maintained closed because of the action of the high pressure fluid in chamber 111.

The reverse operation for the retraction of the input member and the output member 63 is effected by a mere reversal of movement. When this is effected the center land 73 will close against the port 117 while the port 131 will be opened by the movement of the front land 72. Similarly the port 133 will be closed by the movement of the rear land 74. This reverses the pressure arrangement and establishes the high pressure fluid within the chamber 92 while the fluid within the chamber 91 is exhausted and passes through the passageway 123 to the front input chamber 121 and the opened port 131 and thence to the exhaust passageways 126 and 103 in a similar manner to that just described.

The operation will now be described when the hydraulic pressure system fails. Under such failure the hydraulic fluid contained within the apparatus will be trapped therein since the check valve 102 will be closed due to the absence of hydraulic fluid under high pressure in the conduit 101. Likewise the exhaust check valve 105 will be closed when the hydraulic system fails and will close the port 107 through the action of the biasing spring. Under these conditions the hydraulic fluid trapped within the system provides for balanced pressure within the cylinder chambers 91 and 92. With the input member in the neutral position shown in FIGURE 6, there is complete freedom of movement for the passage of hydraulic fluid between the chambers 91 and 92 by communication with the center chamber 115 of the input member.

This communication is effected through passageway 124 leading from the rear cylinder chamber 92 to the rear input chamber 122 and the center chamber 115 past the valve port 118. Similarly the forward cylinder chamber is in communication with the center chamber 115 through the passageway 123 communicating with the forward chamber 121 of the input member and back to the common center chamber 115 through the opened valve port 117.

Should there be a load presented on the output member 63 which is desired to be checked the operator can move the input member in a reverse direction to the force of the load to stop such movement in the same manner as described in connection with FIGURES 1, 2 and 3. Thus as shown in FIGURE 6, should the load tend to cause movement of the output member rearwardly or in a retracted movement with respect to the input member, the input member can be moved reversely, i.e., in a forward direction to oppose such movement and stop it. In such a condition when the hydraulic system has failed, the high pressure created within the forward cylinder chamber 91 will be trapped since it cannot escape through the port 131 which is closed by the movement of the input member through the action of the front land 72. The fluid is further trapped within the forward input member chamber 121 and the center chamber 115 since the center land 73 will close the port 118 and the fluid cannot pass through the center chamber to any other part of the system because the passageway 113 communicating with the center chamber is blocked by the closure of the unidirectional check valve 140 which prevents movement of the fluid through it. Thus the operator, by such movement of the input member, can effectively stop the output member from any movement that might be brought about by the load acting upon it. In similar fashion a load which would tend to cause movement of the output member rearwardly can be counteracted and controlled to stop the movement of the output member by an opposite movement of the input member. Under such conditions when high pressure would be tended to be created in the rear cylinder chamber 92 the input member can be retracted to trap such fluid and prevent its movement in the system. Such movement of the input member will close the center land 73 to block the valve port 117 and the rear land 74 will block the valve port 133. The high pressure fluid within the cylinder chamber 92 thus will be trapped, since it can only pass through the passageway 124 into the rear input member chamber 122 and will be blocked from any further movement by the closure of the aforementioned rear land 74 and the center land 117. The check valve 140 will operate to prevent any passage of fluid from the passageways 113, 114 and 112 in the same manner as described for the reverse type of operation.

The emergency manual operation of the input member 62 to move the output member 63 may be simply effected in the same type of operation as described in connection with FIGURES 1, 2 and 3, when the hydraulic system fails. The failure of the hydraulic system causes the trapping of the hydraulic fluid within the apparatus as above-described, since the check valves 102 and 105 are closed by such failure of the hydraulic fluid pressure. The actual operation of the apparatus is similar to that shown in FIGURE 3 in the schematic diagram. Thus in pushing the input member the manual movement which is translated to the output member 63 is made possible since the trapped fluid can freely pass through the open valves to be described through the input member and the check valve 140. This operation will be pointed out as follows below.

To effect the manual movement of the output rod to the rear the input member is moved in that direction with a certain degree of lost motion until the member 77 upon the input member contacts the stop member 78 positioned at the forward end of the output tube 82. When this degree of movement has been effected the input member will be so moved that the rear land 74 opens the valve port 133 while the center land 73 closes the valve port 118 and the front land 72 closes the valve port 131. Continued movement of the input member will cause the applied force to bear against the stop member 78 by contact with the member 77. This manual movement will tend to create a high pressure within the cylinder chamber 92 which will be immediately relieved since the fluid within the chamber may be exhausted through the passageway 124 into the rear input chamber 122 through the opened valve port 133 to the exhaust passageway 126. From the exhaust passageway the fluid may freely return through the unidirectional check valve 140 by passage of the fluid first of all through the chamber 143 and then through the opened port 141 through the passageway 112 back through the passageway 113 into the center chamber 115 of the input member. From this chamber the fluid is exhausted through the port 114 and from there back to the front chamber 121 and into the front cylinder chamber 91 through the passageway 123. In this manner the operator can push the input member in such a manner that all of the force is transferred to the output member 63. The movement of the output member will be in such a manner that the fluid in the chamber 92 will be displaced corresponding to the degree of manual movement back through the aforementioned path just described to the front cylinder chamber 91. This action is much in the manner of a pump in which the fluid in one chamber is displaced to the other chamber depending upon the degree of movement of the input member and the output member to change the relative position of the piston 88 with respect to the cylinder mounting 61.

The movement of the output member 63 may be effected in a reverse direction to that just described by a reverse movement of the input member 62. For such operation when the hydraulic system has failed, the input member is first retracted in a rearward direction with a small degree of lost motion until the member 77 contacts the rear stop member 79 of the output member. In this position without any application of manual force, the apparatus will be set up for manual operation. Thus the input member will be retracted rearwardly to a position where the rear land 74 closes the valve port 133 while the center land 73 closes the valve port 117 and the valve port 131 is opened by the front land 72. In this position further manual movement of the input member will cause corresponding movement of the output member and the fluid in the front cylinder chamber 91 will be displaced through the opened ports passageways to the rear cylinder chamber 92. Thus as the input member is moved rearwardly the abutment of the member 77 against the stop 79 of the output member will cause the entire cylinder to move in the same direction. The fluid within the chamber 91 will be displaced through the passageway 123 to the front chamber 121 of the input member through the opened valve port 131 into the exhaust passageway 126. From the exhaust passageway 126 the fluid will travel through the opened port of the check valve 140 to the chamber 111 back to passageway 112 into the passage 113. From the passageway 113 the fluid will return to the rear cylinder chamber 92 from passageway 113 through the port 114 into the center chamber of the input member. From there the fluid passes to the rear chamber 122 and then back to the rear cylinder chamber 92 to the passageway 124 connecting these two chambers.

From the above description it will be seen that there has been provided a servo mechanism control cylinder which very effectively accomplishes the desired objectives. When the hydraulic system is properly operating, the input member can be moved without the requirement of any forceful application to control the movement of the output member completely. This operation is effected in such a way that the extent of movement of the input member automatically causes the corresponding movement of the output member to the same degree. When the hydraulic system fails the fluid is trapped within the apparatus and the apparatus is so designed that the input member can be employed to stop any movement of the output member that might be caused by the load acting upon it. This movement is effected by a reverse movement of the input member with respect to the direction of the force applied by the load acting upon the input member. This operation closes the valve passageways as above-described to block the fluid within the apparatus to prevent such movement.

The device can further be effectively used when the hydraulic system fails in such a manner that the input member can be manually moved to transmit the manual force acting upon it directly to the output member. Such emergency application is quite often desired and made extremely necessary for safety precautions where the hydraulic system should fail for one reason or another.

As a further consequence of this invention there has been provided a servo mechanism apparatus in which all of the working valves and ports can be very simply withdrawn from the valve structure. This can be effected without dismounting the housing by merely withdrawing the interior supporting structure with the various valves in the output member and the input control member which are arranged in line with one another. Thus original installation, maintenance or repair are greatly facilitated through this structure.

Various changes and modifications may be made within this apparatus as will readily appear to those skilled in the art. Such changes and modifications are within the scope and teaching of this invention as defined by the claims appended hereto.

What is claimed is:

1. A control device comprising a manually movable input member and an output member adapted to be connected to a work load and movably controlled by the movement of said input member, said output member comprising a cylinder movable by hydraulic pressure, said input member including valve means for porting hydraulic fluid under pressure to the cylinder to control the movement of said output member, said valve means including a plurality of valve elements operable by the movement of the input member, said input member being movable in one direction to port hydraulic fluid under pressure to one side of the cylinder and movable in a reverse direction to port fluid to an opposite side of the cylinder and valve means for trapping fluid within the device when the hydraulic pressure is interrupted, said valve means comprising a check valve in an inlet conduit for the hydraulic fluid and a separate check valve in an outlet conduit which is adapted to be closed by failure of hydraulic pressure within said inlet conduit and means for porting trapped fluid from one side of the cylinder to the other side through the valves of the input member and through a unidirectional check valve to provide for movement of the cylinder when the hydraulic system is interrupted, said check valve being normally closed when the hydraulic pressure fluid is not interrupted.

2. A control device comprising a manually movable input member and an output member adapted to be connected to a work load and movably controlled by the movement of said input member, said output member comprising a cylinder movable by hydraulic pressure, said input member including valve means for porting hydraulic fluid under pressure to the cylinder to control the movement of said output member, said valve means including a plurality of valve elements operable by the movement of the input member, said input member being movable in one direction to port hydraulic fluid under pressure to one side of the cylinder and movable in a reverse direction to port fluid to an opposite side of the cylinder, said output member being in the form of a tube-like housing and containing all of the aforementioned valve elements in its interior in an in-line arrangement, and valve means for trapping fluid within the device when the hydraulic pressure is interrupted comprising separate check valves in each of an inlet and outlet conduit which are adapted to be closed by failure of hydraulic pressure within said inlet conduit.

3. A control device comprising a manually movable input member and an output member adapted to be connected to a work load and movably controlled by the movement of said input member, said output member comprising a cylinder movable by hydraulic pressure, said input member including valve means for porting hydraulic fluid under pressure to the cylinder to control the movement of said output member, said valve means including a plurality of valve elements operable by the movement of the input member, said input member being movable in one direction to port hydraulic fluid under pressure to one side of the cylinder and movable in a reverse direction to port fluid to an opposite side of the cylinder and means for manually moving the output member by the movement of the input member when the hydraulic fluid pressure is interrupted, said input member being concentrically positioned with respect to said output member and axially movable with respect thereto, said output member being in the form of a tube-like housing and containing all of the aforementioned valve elements in its interior in an in-line arrangement, and valve means for trapping fluid within the device when the hydraulic pressure is interrupted comprising separate valves in each of an inlet and outlet conduit which are adapted to be closed by failure of hydraulic pressure within said inlet conduit.

References Cited in the file of this patent

UNITED STATES PATENTS

| | | |
|---|---|---|
| 2,395,671 | Kleinhans et al. | Feb. 26, 1946 |
| 2,633,102 | Baldwin et al. | Mar. 31, 1953 |
| 2,648,346 | Deardorff et al. | Aug. 11, 1953 |
| 2,681,043 | Irwin | June 15, 1954 |
| 2,705,940 | Edwards | Apr. 12, 1955 |
| 2,717,579 | LeDucuc | Sept. 13, 1955 |
| 2,717,652 | Nichols | Sept. 13, 1955 |